April 15, 1924. 1,490,273

W. J. IRVIN

MOLDING MACHINE

Filed June 20, 1921 2 Sheets-Sheet 1

Walter J. Irvin
By F. E. Shannon
attorney.

Patented Apr. 15, 1924.

1,490,273

UNITED STATES PATENT OFFICE.

WALTER J. IRVIN, OF AKRON, OHIO.

MOLDING MACHINE.

Application filed June 20, 1921. Serial No. 478,802.

*To all whom it may concern:*

Be it known that I, WALTER J. IRVIN, a citizen of the United States, residing at Akron, in the county of Summit and State of Ohio, have invented new and useful Improvements in Molding Machines, of which the following is a specification.

This invention relates to molding machines of the type especially adapted for use in constructing molds for the manufacture of pulleys and similar castings.

It is an object of the invention to provide a strong, durable molding machine of simple, economical construction, which will be convenient to operate and which may be quickly adjusted to manufacture molds for pulleys of different designs and sizes.

A particular object is to provide a thoroughly practicable molding machine which may be used in connection with a jolting device and which when so used may be conveniently adjusted and firmly held in adjustment.

With the above and other objects in view which will appear as this description proceeds, my invention comprises the novel features of construction, combination and arrangement of parts hereinafter described and illustrated in the accompanying drawing, which forms a part hereof and in which I have shown a preferred embodiment of the invention, it being understood that the invention is not confined to the precise details of construction illustrated, but that changes, variations and modifications may be made which come within the scope of the appended claims.

In the drawings in which similar numerals of reference have been employed to designate the same or like parts as they may appear in the several views, Figure 1 is a plan view of a molding machine constructed in accordance with this invention.

Figure 1:
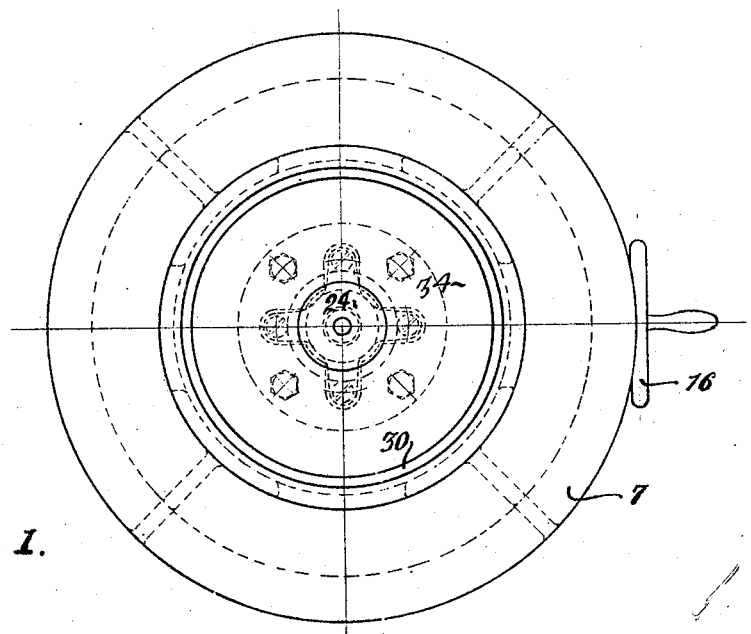
Figure 2:
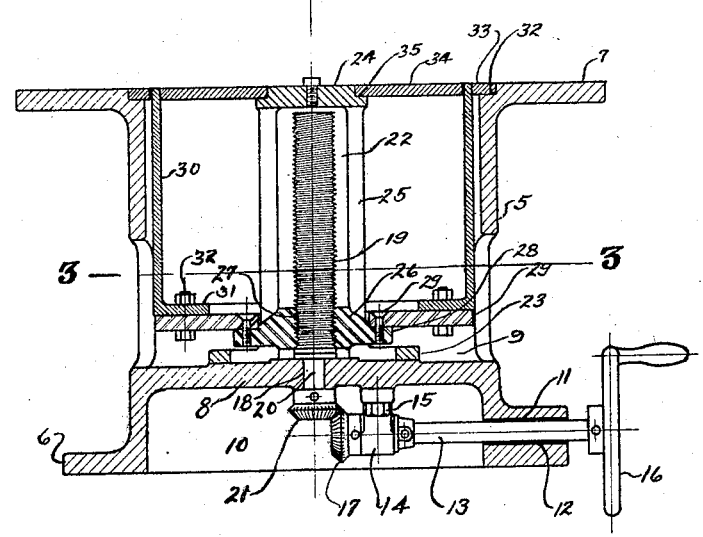
Figure 2 is a view showing the same in central vertical section and taken as indicated by the line 2—2 of Figure 1.
Figure 3:
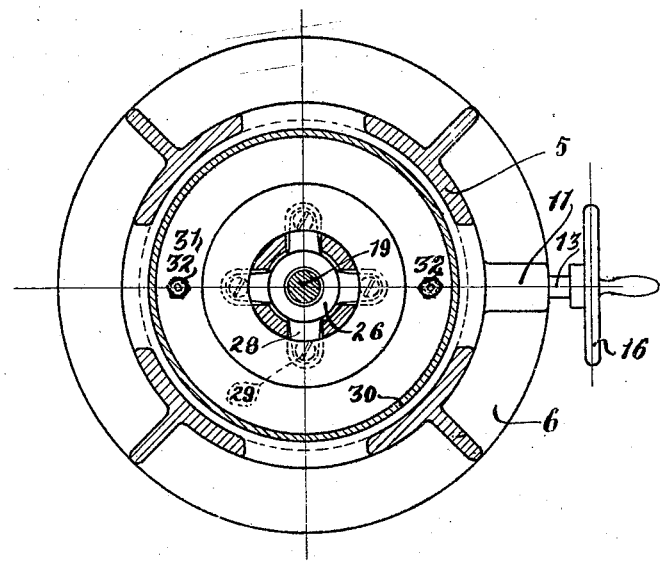
Figure 3 is a horizontal sectional view taken approximately on the line 3—3 of Figure 2.

Referring now to a more detailed description of the invention, with reference to the accompanying drawing, the numeral 5 denotes a tubular supporting standard which is provided at its lower end with an outwardly projecting, circumferentially extending flange 6. The standard 5 is also provided at its upper end with an outwardly projecting annular flange 7 which is formed thereon so as to form a supporting table for a molding flask or one of the sections thereof. The numeral 8 denotes a horizontally disposed wall which is integral with the standard 5 and extends entirely across the opening in said standard 5 in spaced relation to the bottom thereof, thus forming an upper chamber 9 and a relatively smaller lower chamber 10. The flange 6 is provided on its upper face with a radially directed protruding portion 11 and a radially directed bore 12 extends through said protruding portion 11 and through the wall of the standard 5. A shaft 13 is rotatably mounted in the bore 12 so as to project radially into the chamber 10 to a point adjacent the center thereof. The inwardly projecting end of the shaft 13 is journaled in a suitable bracket 14 which is secured to the wall 8 by the bolts 15. The outwardly projecting end of the shaft 13 is provided with a hand wheel 16 which is rigidly secured thereto and a beveled pinion 17 is similarly secured on the inner projecting end of said shaft 13.

The numeral 19 denotes a screw shaft which is offset smaller adjacent the lower end thereof to form a reduced portion 20. The wall 8 is provided with a centrally positioned vertical bore 18 and the reduced portion 20 of the screw shaft 19 is rotatably mounted in said bore with the threaded portion of the shaft 19 projecting upwardly from the wall 8 and the lower end 20 of said shaft projecting downwardly beyond said wall. A beveled pinion 21 is rigidly secured to the downwardly projecting end 20 of the shaft 19 so as to mesh with the pinion 17 on the shaft 13.

The numeral 22 denotes a tubular center post which is provided at its lower end with an outwardly projecting flange 23 which is bolted or otherwise secured to the wall 8. The upper end of the post 22 is closed with the wall 24, the upper surface of which is disposed in the same horizontal plane with the upper face of the flange 7. The center post 22 is provided with a plurality of vertical slots 25 which are formed in the wall thereof at regularly recurring points. A spider 26 which is provided with a threaded bore 27 is operatively threaded on the shaft 19. The numeral 28 denotes a plurality of radiating arms which are formed on said spider so that one of said arms 28 extends through each slot or opening 25 and projects beyond the post 22. An annular plate 29 having a width sufficient to loosely fill the space between the standard 5 and the center post 22 is positioned on the outwardly projecting ends of the arms 28 to which it is secured by means of the screw bolts 29. The numeral 30 denotes a cylindrical pattern which is provided at the bottom thereof with an inwardly projecting annular flange 31 and is detachably secured to the plate 29 by means of the bolts 32. The pattern is preferably formed so that the upper edge thereof is in the same horizontal plane with the upper edge of the top 24 of the post 22 and the upper surface of the flange 7, when the spider 26 is in a downward position. The inner edge of the standard 5 is cut away on its upper end to provide an annular rabbet which forms a seat for the ring 33 and the ring 33 closes the opening between the upper edge of the pattern 30 and the casing 5. The upper plate 24 of the center post 22 is also rabbeted at its upper edge to provide a seat 35 for the annular plate 34 which is adapted to fill the space between said center post and the pattern 30.

In using my improved machine to manufacture pulleys, a flask section is placed on the flange 7 and the hand wheel 16 is rotated in the proper direction to force the spider 26 upwardly on the screw shaft 19. The pattern 30 is thus forced upwardly until it projects the desired distance above the upper face of the flange 7. The hub and spoke pattern are then assembled on the pattern table formed by the wall 24 and the annular plate 34. The flask section is then filled with sand which is packed firmly about the pattern. The rim pattern 30 is then lowered by reversely rotating the hand wheel 16 and the flask is removed from the machine.

The machine is designed particularly for use on a jolting device, the construction thereof being such that it will not be jolted out of adjustment by the jolting operation.

It will be seen that the pattern 30 may be furnished in a plurality of sizes which may be interchangeably used in the machine, the rings 32 and 35 also being furnished in a number of different sizes so that the opening between the flange 7 and the pattern and between the pattern and the center plate 24 may be closed to provide a relatively smooth flask and pattern table.

Having thus described my invention and illustrated a preferred embodiment thereof what I claim as new and desire to secure by Letters Patent is:—

1. In a device of the class described, a tubular support, an outwardly projecting base flange at the bottom thereof; an outwardly projecting annular flask supporting flange at the top thereof, a horizontal partition extending across said support in spaced relation to the bottom thereof, a tubular center post supported by said partition, the upper end of said post being provided with a wall which is disposed in the same horizontal plane with said flask-supporting flange, a plurality of regularly spaced, vertically disposed slots in said post, a centrally positioned vertical bore in said partition, a shaft rotatably mounted in said bore so as to project from both sides of said partition, the upwardly projecting portion of said shaft provided with a screw thread, a beveled pinion on the downwardly projecting end of said shaft, a spider, having a threaded bore operatively mounted on the threaded portion of said shaft with the arms of the spider projecting through the slots in said post; an annular plate adapted to loosely fit between the center post and the walls of said support, said plate being secured to the arms of said spider, a tubular pattern concentrically arranged between said post and said support, said pattern being detachably secured to said plate, a ring supported by said center post so as to close the opening between said post and said pattern and a ring arranged on said support to close the opening between the support and said pattern, the upper face of said rings being disposed in the same horizontal plane with the flask supporting flange, a radially directed horizontal bore extending into said support at a point adjacent the bottom thereof; a shaft journaled in said bore, a beveled pinion secured to the inner end of said shaft so as to mesh with the first named pinion and a hand wheel on the outwardly projecting end of said horizontal shaft.

2. In a device of the class described, a tubular support, an outwardly projecting annular flask supporting flange at the top thereof, a horizontal partition extending across said support in spaced relation to the bottom thereof, a tubular center post supported by said partition, the upper end of said post being provided with a wall which is disposed in the same horizontal plane with said flask-supporting flange, a plurality of regularly spaced vertical disposed slots in said post, a centrally positioned, vertical bore in said partition, a shaft rotatably mounted in said bore so as to project from both sides of said partition, the upwardly projecting portion of said shaft provided with a screw thread; a spider having a threaded bore, operatively mounted on the threaded portion of said shaft with the arms of the spider projecting through the slot in said post; an annular plate adapted to loosely fit between the center post and the walls of said support, said plate being secured to the arms of said spider, a tubular pattern concentrically arranged between said post and said support, said pattern being detachably secured to said plate, a ring supported by said center post so as to close the opening between said post and said pattern and a ring arranged on said support to close the opening between the support and said pattern and manually operable means to rotate said shaft to raise and lower said pattern.

3. In a molding machine, the combination of a tubular casing provided with a flask supporting flange, a tubular center post provided with pattern supporting means, a cylindrical rim pattern concentrically arranged therebetween, slots in the side of said post, a spider in said post, the arms of said spider projecting from said slots, means connecting the said pattern to said spider, a screw shaft in said post, said spider operatively mounted thereon and means to rotate said shaft to raise and lower said pattern.

4. In a molding machine, the combination of a tubular casing provided with a flask supporting flange, a horizontal partition in said casing, a center post supported by said partition, a pattern table supported by said post, a cylindrical rim pattern concentrically arranged between said casing and said post, regularly arranged vertical slots in the wall of said posts, a screw shaft rotatably secured to said partition so as to extend upwardly in the center of said post, a member operatively mounted on said shaft so as to be movable vertically by the rotation thereof, means connecting said member with said rim pattern and means to rotate said shaft to raise and lower same.

5. In a molding machine, a vertically movable pattern and means to raise and lower said pattern, said means including a screw shaft, a nut thereon, direct connecting means between said nut and said pattern and means to rotate said shaft.

6. A molding machine of the class described including a flask table, a vertically movable rim pattern and means to raise and lower said pattern, said means including a screw shaft, a nut thereon and means to rigidly fix said pattern to said nut.

In testimony whereof I have hereunto set my hand.

WALTER J. IRVIN.